Patented June 13, 1950

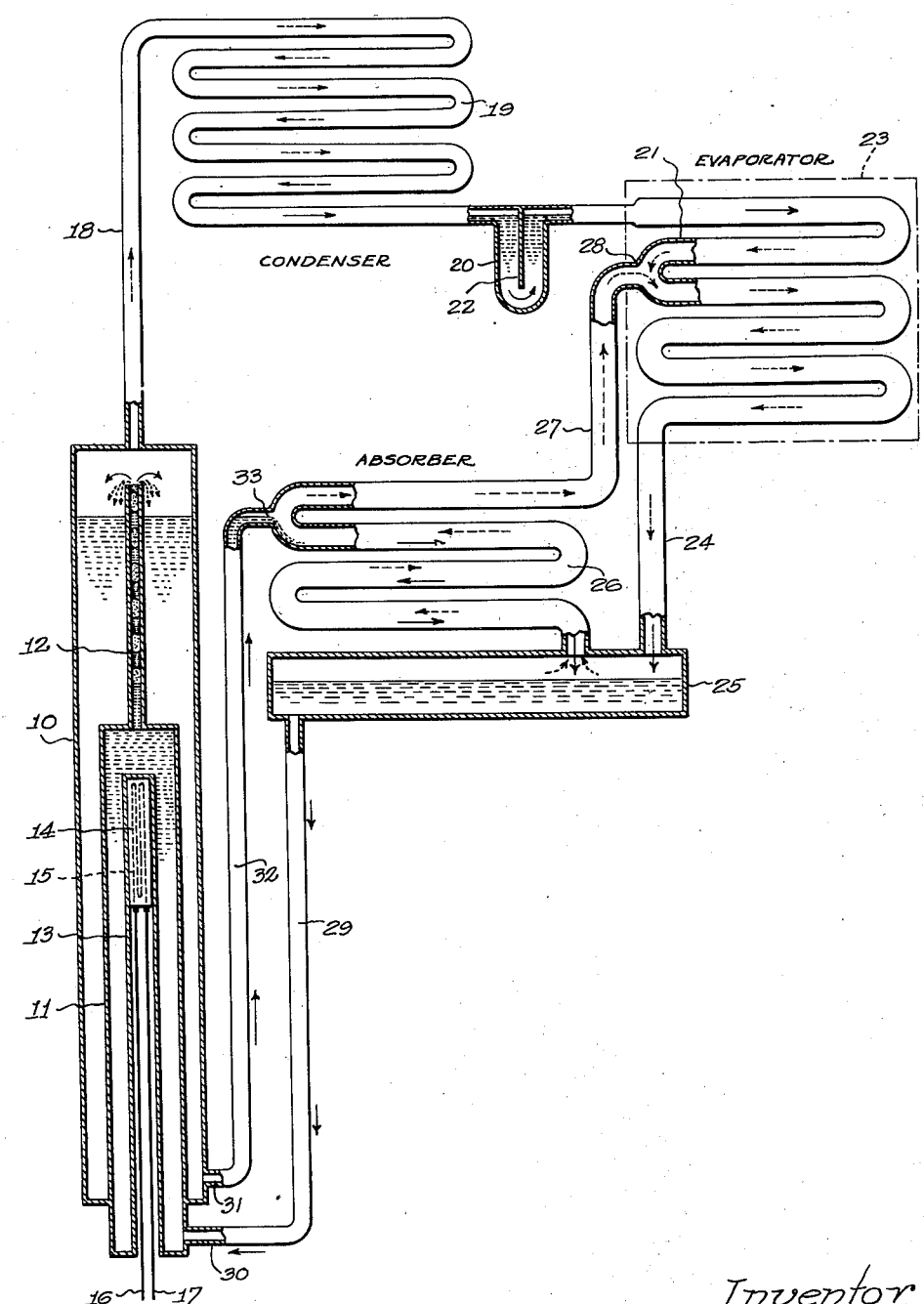

2,511,568

UNITED STATES PATENT OFFICE 2,511,568

REFRIGERATING APPARATUS

George Howlett Davis, Detroit, Mich.

Application November 13, 1945, Serial No. 627,998

6 Claims. (Cl. 62—119.5)

This invention relates to refrigerating apparatus, and particularly to absorption refrigerating apparatus.

One object of this invention is to provide an absorption refrigerating apparatus wherein an improved electrical heater achieves a more efficient operation at lower cost.

Another object is to provide an absorption refrigerating apparatus wherein the standpipe, generator and heater tube are greatly elongated in proportion to their diameter, the electric heater is placed high in the generator, and the lower portions of the generator and standpipe below the heater are prolonged so as to provide a self-contained heat exchanger, thereby increasing the efficiency and economy of the apparatus and eliminating or reducing the necessity for placing an external heat exchanger between the standpipe and the absorber.

Another object is to provide an absorption refrigerating apparatus which employs an electric heater of an extremely high watt density in a small diameter heater tube, the passage of liquid in the generator past the heater tube being so rapid that the heater is kept sufficiently cooled to prevent its burning out.

Another object is to provide an absorption refrigerating apparatus wherein the standpipe, generator, and heater tube are kept at small diameters by the use of a high watt density electric heater, thereby enabling them not only to be mounted in more restricted space but also reducing the radiation surface thereof and consequently reducing the heat loss therefrom.

Another object is to provide an absorption refrigerating apparatus as set forth in the object immediately preceding, wherein the small diameter of the standpipe enables it to be more efficiently insulated against heat losses by radiation or conduction.

Other objects and advantages of the invention will become apparent during the course of the following description of the drawing, wherein:

The figure is a diagrammatic view of a preferred embodiment of the absorption refrigerating apparatus of this invention, partly in section, with the direction of flow of gas being shown by dotted arrows and of liquid by solid arrows.

Hitherto, where an electric heater has been employed, it has been placed at the bottom of a short, large-diameter generator. In operation, however, the ammonia gas is liberated from the surface of the liquid at the top of the generator, hence the heat is emitted remote from the point of gas liberation, resulting in sluggishness of response, waste of heat and inefficiency in operation. Further, inefficiency, loss of heat and increase in cost of operation has resulted from placing the heater at the bottom of the generator because in that location, the heater is adjacent the water outlet from the standpipe to the absorber and also adjacent the inlet of water from the reservoir so that the water, liberated of its ammonia gas and already warm, is further and unnecessarily heated just as it is leaving the generator. In the absorber, however, cool water absorbs ammonia gas more readily and in greater quantity than warm water, hence, prior systems have found it necessary to cool this water after it leaves the standpipe by passing it through an external heat exchanger. Without this external heat exchanger, the efficiency is low, yet with it, the cost of the device is increased.

Moreover, in prior absorption systems, the large diameter, low watt density heater used, necessarily requires a large standpipe, creating a large radiating area which dissipates heat energy, is difficult to insulate, and require a large amount of space for installation. Finally, the higher cost of electricity in the United States has made the electrically-heated absorption refrigeration system unable to compete with the electrically-driven compressor type, hence illuminating gas has hitherto been used exclusively as the heat source in domestic refrigerators. Gas heating, however, emits fumes, uses up oxygen from the room in which it is installed, is subject to leaks causing danger of explosions and gas poisoning, is somewhat noisy, requires a constantly burning flame which wastes gas, and cannot be conveniently or cheaply used in rural districts and remote localities where piped gas is not available.

The present invention eliminates or reduces these difficulties, increases the efficiency of the system and reduces its cost of operation to where it can compete with the gas-heated domestic refrigerator of the absorption type. To do this it utilizes a high-watt density electric heater which is smaller in length and diameter than the ordinary electric heater and which is placed high in the generator, near the surface of the liquid where the ammonia gas is liberated. The generator and standpipe are made of small diameter and are extended a considerable distance below the heater so as to form a heat exchanger within the standpipe itself. The outlet from the standpipe and the inlet to the generator are placed at the bottom of this heat exchanger extension, remote from the electric heater. By this arrangement, the hot water which has been freed of its ammonia at the top of the generator and standpipe by heat from the heater, is cooled by the heat exchanger extension as it descends towards its outlet to the absorber. This is done by the cool aqua ammonia from the reservoir ascending through the heat exchanger extension of the generator to the heater. Thus, the ammonia-free water from the standpipe is cool when it reaches the absorber, hence will absorb a greater amount of ammonia, whereas the water ascending the generator is already warm when it reaches the heater by reason of this heat exchange within the extended portions of the standpipe and generator. Since the heater is now remote from the outlet of the standpipe, no heat reaches the outgoing water to lower its ammonia-absorbing capacity in the absorber, as in prior systems. The use of the small-diameter high watt density heater enables the use of a small diameter generator and standpipe, thereby reducing the heat dissipating area of the latter, making it easier to insulate more efficiently and require less space in which to install it. In evolving the present invention, it was found that the high watt density heater did not burn out as might be expected, because its heat output is carried away so rapidly by the liquids that its maximum temperature is kept very low, below the boiling points of the liquids involved. Moreover, this electric heater needs to be used only intermittently as needed, whereas the gas of the prior devices must always be kept burning. By this construction and arrangement, the present invention increases the efficiency and reduces the cost of operation of the electrically-heated absorption system to a level where it can compete with electrically-driven compressor systems. It will also operate without change on direct current or alternating current of any number of cycles.

Referring to the drawing in detail, Figure 1 shows a preferred embodiment of the absorption refrigerating apparatus of this invention as consisting of a standpipe 10 which is of relatively small diameter in proportion to its height. The standpipe 10 contains a generator 11 rising from the bottom thereof and having at its top a percolator tube 12 which extends nearly to the top of the standpipe 10. The generator 11, being almost wholly within the small diameter standpipe 10 is also necessarily of relatively small diameter in proportion to its length. Extending high into the interior of the generator 11 is a heater tube 13 with its top approaching closely to the top of the generator 11 and consequently lying in close proximity to the inlet of the percolator tube 12.

Mounted within the heater tube 13 at the top thereof is an electric heater 14 of an extremely high watt density rating and having its heating element 15 connected by conductors 16 and 17 to an external source of electric current, such as to a house lighting circuit. The standpipe 10, the generator 11 and the heater tube 13 are so mounted one within the other that they enclose mutually independent and internally unconnected chambers, excepting only the connection provided by the percolator tube 12 between the top of the generator 11 and the upper portion of the standpipe 10 or the external connections through the remainder of the system.

Extending upward from the top of the standpipe 10 is a conduit 18 leading to a condenser 19 which in turn is connected to a trap 20 having a partition 22 forming a liquid seal between the condenser 19 and an evaporator 21 connected to the opposite side of the trap 20.

The evaporator 21 is housed in an evaporator casing 23 placed in the compartment to be cooled and usually having coils surrounding or encircling a space containing the usual ice cube trays (not shown). For simplicity, however, the evaporator 21 is shown as having its coils in an approximately vertical plane. From the lower end of the evaporator 21 is a conduit 24 extending downward to the top of a reservoir 25 from the top of which the coils of the absorber 26 rise. Extending upward from the upper end of the absorber 26 is a conduit 27 connected as at 28 to a point near the top of the evaporator 21.

Extending downward from the bottom of the reservoir 25 is a conduit 29 connected as at 30 to the bottom of the generator 11. Connected as at 31 to the bottom of the standpipe 10 is a conduit 32 which rises and is connected as at 33 to the upper part of the absorber 26.

In preparing the system for operation, it is first evacuated and then the reservoir 25 is partially filled with strong solution of ammonia gas in water. Hydrogen gas is then forced into the system until the gauge pressure is raised to between 180 and 250 pounds, depending upon the ambient temperatures and the desired evaporator temperature. Since gravity is conveniently used for causing the circulation of the liquids involved, it is preferable to arrange the condenser 19 higher than the evaporator 11, the evaporator 21 higher than the absorber 33, the upper portion of the absorber 33 approximately at the same level as the upper portion of the standpipe 10, and the reservoir 25 below the absorber.

In operation, electric current supplied through the wires 16 and 17 heats up the high watt density heater 14, heating the aqua ammonia in the upper portion of the generator 11 and, by conduction through the side walls of the generator 11, also heating the aqua ammonia in the upper portion of the standpipe 10. By the action of this heat, a vapor pressure is developed, the ammonia gas separates out from solution and bubbles up through the percolator tube 12 along with the heated liquid. The liquid overflows from the top of the percolator tube 12 into the upper portion of the standpipe 10, whereas the ammonia gas from the percolator tube 12, being warm and accompanied by ammonia gas liberated from the surface of the liquid in the upper portion of the standpipe 10, passes upward through the conduit 18 into the upper end of the condenser 19. The greater the heat supplied from the high watt density heater 15, the faster is the rate of liquid flow, and the greater is the quantity of heat carried away by the liquid. The heater 15 thus remains at a relatively low temperature and hence is in no danger of burning out.

The ammonia gas passing through the condenser 19, being at a considerable pressure, is liquefied when thus cooled and flows through the trap 20 into the evaporator 21. Here it evaporates back into ammonia gas again, and this diffuses into the hydrogen gas already in the evaporator 21 and absorber 26. The mixture of ammonia gas and hydrogen gas, being heavier than hydrogen alone, descends through the evaporator 21 into the reservoir 25. As the evaporation and expansion of the ammonia gas takes place, according to well-known principles of thermodynamics, it absorbs heat and this in turn cools or freezes materials within the evaporator casing 23.

As water overflows from the percolator tube 12, the liquid level at the top of the standpipe 10 readjusts its level to that of the level of the water at the absorber port 33, causing water in the standpipe 10 which remains after the ammonia gas is driven off, to descend to the port 31 at the bottom of the standpipe 10, and pass upward through the conduit 32 to the port 33 of the absorber 26, at the same level as the level of the liquid in the other arm thereof. As this liquid passes downwardly along the lower or heat exchanger portion of the generator 11, it is cooled by the comparatively cold aqua ammonia passing from the reservoir 25 downward through the conduit 29 and port 30 into the bottom of the generator 11. This heat exchange takes place at the wall of the generator 11 near the bottom thereof. Thus the water passing upward through the tube 32 is relatively cool and also comparatively free from ammonia. This cool water flows by gravity downward through the coils of the absorber 26.

In the meantime, the mixture of hydrogen gas and ammonia gas which has descended into the upper part of the reservoir 25 from the evaporator through the pipe 24 passes upward through the absorber 26, meeting the descending stream of cool water entering through the port 33. This water, being cool and comparatively pure, is in a satisfactory condition to absorb ammonia gas and it does so, extracting the ammonia gas from the mixture of ammonia gas and hydrogen gas passing upward through the absorber. The aqua ammonia thus produced flows downward into the reservoir 25, whereas the hydrogen gas, freed from its ammonia gas content, is lightened thereby and rises through the conduit 27 and passes through the port 28 back into the evaporator 21 where it is available to repeat the foregoing cycle.

Finally, as previously stated, the aqua ammonia produced in the absorber 26 and deposited in the reservoir 25, flows downward through the conduit 29 and port 30 into the lower or heat exchanger part of the elongated generator 11, whence it rises to be heated by the high watt density electric heater 14, replacing the liquid which has given off its gas by the action of the heat and has percolated upward through the percolator tube 12 into the top of the standpipe 10. As previously stated, while the cold aqua ammonia is passing upward from the port 30 through the lower or heat exchanger portion of the generator 11, it extracts heat by conduction through the side walls of the generator 11 from the descending column of water which has been freed from its ammonia gas by the heat and is flowing toward the port 31 and conduit 32 to the port 33 in the absorber 26.

While I have shown and described my invention in detail, it is to be understood that the same is to be limited only by the appended claims, for many changes may be made without departing from the spirit and scope of my invention.

What I claim is:

1. In an absorption refrigerating apparatus, an elongated standpipe, an elongated generator mounted within said standpipe and having a conduit extending from the top thereof to the top space in said standpipe, a heater mounted in said generator near the top thereof, said standpipe and said generator being prolonged below said heater to form a heat exchanger extension thereof, and a refrigerant absorber having its upper part connected to the lower part of said standpipe and having its lower part connected to the lower part of said generator whereby the cool liquid ascending through the prolonged portion of said generator from said absorber extracts heat from the warm liquid descending through the prolonged portion of said standpipe on its way to said absorber.

2. In an absorption refrigerating apparatus, an elongated standpipe, an elongated generator mounted within said standpipe and having a conduit extending from the top thereof to the top space in said standpipe, a heater mounted in said generator near the top thereof, said standpipe and said generator being prolonged below said heater to form a heat exchanger extension thereof, and a refrigerant absorber having its upper part connected to the lower part of said standpipe and having its lower part connected to the lower part of said generator whereby the cool liquid ascending through the prolonged portion of said generator from said absorber extracts heat from the warm liquid descending through the prolonged portion of said standpipe on its way to said absorber, the places of connection of said absorber with said standpipe and said generator being located remote from said heater.

3. In an absorption refrigerating apparatus, an elongated standpipe, an elongated generator mounted within said standpipe and having a conduit extending from the top thereof to the top space in said standpipe, a high watt density electric heater mounted in said generator near the top thereof, said standpipe and said generator being prolonged below said heater to form a heat exchanger extension thereof, and a refrigerant absorber having its upper part connected to the lower part of said standpipe and having its lower part connected to the lower part of said generator whereby the cool liquid ascending through the prolonged portion of said generator from said absorber extracts heat from the warm liquid descending through the prolonged portion of said standpipe on its way to said absorber.

4. A combination standpipe, generator and heat exchanger for an absorption refrigerating apparatus, comprising an elongated standpipe, an elongated generator mounted within said standpipe and having a conduit extending from the top thereof to the top space in said standpipe, and a heater mounted in said generator near the top thereof, said standpipe and said generator being prolonged below said heater to provide a heat exchanger extension thereof.

5. A combination standpipe, generator and heat exchanger for an absorption refrigerating apparatus, comprising an elongated standpipe, an elongated generator mounted within said standpipe and having a conduit extending from the top thereof to the top space in said standpipe, and a heater mounted in said generator near the top thereof, said standpipe and said generator being prolonged below said heater to provide a heat exchanger extension thereof, said generator having an inlet and said standpipe having an outlet, said inlet and outlet being disposed near the bottom of said heat exchanger extension remote from said heater.

6. A combination standpipe, generator and heat exchanger for an absorption refrigerating apparatus, comprising an elongated standpipe, an elongated generator mounted within said standpipe and having a conduit extending from the top thereof to the top space in said standpipe, and a high watt density electric heater mounted in said generator near the top thereof, said standpipe and said generator being prolonged below said heater to provide a heat exchanger extension thereof.

GEORGE HOWLETT DAVIS.

REFERENCES CITED

The following references are of record in the file of this patent:

UNITED STATES PATENTS

| Number | Name | Date |
|---|---|---|
| 1,687,957 | Von Platen et al. | Oct. 16, 1928 |
| 1,737,426 | Maiuri et al. | Nov. 26, 1929 |
| 1,791,441 | Bentsch | Feb. 3, 1931 |
| 2,199,077 | Lenning | Apr. 30, 1940 |